US009137164B2

(12) United States Patent
Thibeault et al.

(10) Patent No.: US 9,137,164 B2
(45) Date of Patent: Sep. 15, 2015

(54) UPSTREAM RECEIVER INTEGRITY ASSESSMENT FOR MODEM REGISTRATION (71) Applicant: General Instrument Corporation, Horsham, PA (US)

(72) Inventors: Brian K. Thibeault, Attleboro, MA (US); Edward L. Anton, Framingham, MA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 13/677,618

(22) Filed: Nov. 15, 2012

(65) Prior Publication Data

US 2014/0133533 A1  May 15, 2014

(51) Int. Cl.
H04B 1/38 (2006.01)
H04B 3/00 (2006.01)
H04L 12/803 (2013.01)

(52) U.S. Cl.
CPC .................................. H04L 47/125 (2013.01)

(58) Field of Classification Search
USPC ........... 375/220, 222, 257, 377; 370/217, 228
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman |
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

"A Simple Algorithm for Fault Localization Using Naming Convention and Micro-reflection Signature," Invention Disclosure 60193, Cable Television Laboratories, Inc., Jun. 2008, p. 2.

(Continued)

*Primary Examiner* — Khanh C Tran
(74) *Attorney, Agent, or Firm* — Stewart M. Wiener (57) ABSTRACT

A method and computing device for assessing the integrity of receivers in a Cable Modem Termination System (CMTS) to improve load balancing. The method configures a load balancing manager to move registered modems between the receivers, where each receiver is tuned to a frequency. The method obtains a signal quality measurement for each receiver, and, for each receiver, evaluates the signal quality measurement, and identifies the receiver as an impaired receiver when the frequency to which the receiver is tuned is identified by the evaluating as an impaired frequency. The method attempts to repair each impaired receiver, and notifies the load balancing manager to not allow moving the registered modems to each impaired receiver that is not repairable, and to allow moving the registered modems to each receiver that transitions from impaired to unimpaired.

17 Claims, 6 Drawing Sheets

(56) References Cited

U.S. PATENT DOCUMENTS

| | | | |
|---|---|---|---|
| 5,532,865 A | 7/1996 | Utsumi et al. | |
| 5,557,603 A | 9/1996 | Barlett et al. | |
| 5,606,725 A | 2/1997 | Hart | |
| 5,631,846 A | 5/1997 | Szurkowski | |
| 5,694,437 A | 12/1997 | Yang et al. | |
| 5,732,104 A | 3/1998 | Brown et al. | |
| 5,790,523 A | 8/1998 | Ritchie et al. | |
| 5,862,451 A | 1/1999 | Grau et al. | |
| 5,867,539 A | 2/1999 | Koslov | |
| 5,870,429 A | 2/1999 | Moran et al. | |
| 5,886,749 A | 3/1999 | Williams et al. | |
| 5,939,887 A | 8/1999 | Schmidt et al. | |
| 5,943,604 A | 8/1999 | Chen et al. | |
| 6,032,019 A | 2/2000 | Chen et al. | |
| 6,061,393 A | 5/2000 | Tsui et al. | |
| 6,108,351 A | 8/2000 | Hardy et al. | |
| 6,154,503 A | 11/2000 | Strolle | |
| 6,229,792 B1 | 5/2001 | Anderson et al. | |
| 6,230,326 B1 | 5/2001 | Unger et al. | |
| 6,233,274 B1 | 5/2001 | Tsui et al. | |
| 6,240,553 B1 | 5/2001 | Son et al. | |
| 6,272,150 B1 | 8/2001 | Hrastar et al. | |
| 6,278,730 B1 | 8/2001 | Tsui et al. | |
| 6,308,286 B1 | 10/2001 | Richmond et al. | |
| 6,310,909 B1 | 10/2001 | Jones | |
| 6,321,384 B1 | 11/2001 | Eldering | |
| 6,330,221 B1 | 12/2001 | Gomez | |
| 6,334,219 B1 | 12/2001 | Hill et al. | |
| 6,377,552 B1 | 4/2002 | Moran et al. | |
| 6,385,773 B1 | 5/2002 | Schwartzman et al. | |
| 6,389,068 B1 | 5/2002 | Smith et al. | |
| 6,434,583 B1 | 8/2002 | Dapper et al. | |
| 6,445,734 B1 | 9/2002 | Chen et al. | |
| 6,456,597 B1 | 9/2002 | Bare | |
| 6,459,703 B1 | 10/2002 | Grimwood et al. | |
| 6,477,197 B1 | 11/2002 | Unger | |
| 6,480,469 B1 | 11/2002 | Moore et al. | |
| 6,483,033 B1 | 11/2002 | Simoes et al. | |
| 6,498,663 B1 | 12/2002 | Farhan et al. | |
| 6,512,616 B1 | 1/2003 | Nishihara | |
| 6,526,260 B1 | 2/2003 | Hick et al. | |
| 6,546,557 B1 | 4/2003 | Ovadia | |
| 6,556,239 B1 | 4/2003 | Al Araji et al. | |
| 6,556,562 B1 | 4/2003 | Bhagavath et al. | |
| 6,556,660 B1 | 4/2003 | Li et al. | |
| 6,559,756 B2 | 5/2003 | Al Araji et al. | |
| 6,563,868 B1 | 5/2003 | Zhang et al. | |
| 6,570,394 B1 | 5/2003 | Williams | |
| 6,570,855 B1 * | 5/2003 | Kung et al. | 370/237 |
| 6,570,913 B1 | 5/2003 | Chen | |
| 6,574,797 B1 | 6/2003 | Naegeli et al. | |
| 6,588,016 B1 | 7/2003 | Chen et al. | |
| 6,606,351 B1 | 8/2003 | Dapper et al. | |
| 6,611,795 B2 | 8/2003 | Cooper | |
| 6,646,677 B2 | 11/2003 | Noro et al. | |
| 6,662,135 B1 | 12/2003 | Burns et al. | |
| 6,662,368 B1 | 12/2003 | Cloonan et al. | |
| 6,671,334 B1 | 12/2003 | Kuntz et al. | |
| 6,687,632 B1 | 2/2004 | Rittman | |
| 6,690,655 B1 | 2/2004 | Miner et al. | |
| 6,700,875 B1 | 3/2004 | Schroeder et al. | |
| 6,700,927 B1 | 3/2004 | Esliger et al. | |
| 6,711,134 B1 | 3/2004 | Wichelman et al. | |
| 6,741,947 B1 | 5/2004 | Wichelman et al. | |
| 6,748,551 B2 | 6/2004 | Furudate et al. | |
| 6,757,253 B1 | 6/2004 | Cooper et al. | |
| 6,772,388 B2 | 8/2004 | Cooper et al. | |
| 6,772,437 B1 | 8/2004 | Cooper et al. | |
| 6,816,463 B2 | 11/2004 | Cooper et al. | |
| 6,839,829 B1 | 1/2005 | Daruwalla et al. | |
| 6,853,932 B1 | 2/2005 | Wichelman et al. | |
| 6,877,166 B1 | 4/2005 | Roeck et al. | |
| 6,895,043 B1 | 5/2005 | Naegeli et al. | |
| 6,895,594 B1 | 5/2005 | Simoes et al. | |
| 6,906,526 B2 | 6/2005 | Hart et al. | |
| 6,928,475 B2 | 8/2005 | Schenkel et al. | |
| 6,944,881 B1 | 9/2005 | Vogel | |
| 6,961,314 B1 | 11/2005 | Quigley et al. | |
| 6,961,370 B2 | 11/2005 | Chappell | |
| 6,967,994 B2 | 11/2005 | Boer et al. | |
| 6,973,141 B1 | 12/2005 | Isaksen et al. | |
| 6,985,437 B1 | 1/2006 | Vogel | |
| 6,999,408 B1 | 2/2006 | Gomez | |
| 7,002,899 B2 | 2/2006 | Azenkot et al. | |
| 7,010,002 B2 | 3/2006 | Chow et al. | |
| 7,017,176 B1 | 3/2006 | Lee et al. | |
| 7,032,159 B2 | 4/2006 | Lusky et al. | |
| 7,039,939 B1 | 5/2006 | Millet et al. | |
| 7,050,419 B2 | 5/2006 | Azenkot et al. | |
| 7,054,554 B1 | 5/2006 | McNamara et al. | |
| 7,058,007 B1 | 6/2006 | Daruwalla et al. | |
| 7,072,365 B1 | 7/2006 | Ansley | |
| 7,079,457 B2 | 7/2006 | Wakabayashi et al. | |
| 7,099,412 B2 | 8/2006 | Coffey | |
| 7,099,580 B1 | 8/2006 | Bulbul | |
| 7,139,283 B2 | 11/2006 | Quigley et al. | |
| 7,142,609 B2 | 11/2006 | Terreault et al. | |
| 7,152,025 B2 | 12/2006 | Lusky et al. | |
| 7,158,542 B1 | 1/2007 | Zeng et al. | |
| 7,164,694 B1 | 1/2007 | Nodoushani et al. | |
| 7,177,324 B1 | 2/2007 | Choudhury et al. | |
| 7,197,067 B2 | 3/2007 | Lusky et al. | |
| 7,222,255 B1 | 5/2007 | Claessens et al. | |
| 7,227,863 B1 | 6/2007 | Leung et al. | |
| 7,242,862 B2 | 7/2007 | Saunders et al. | |
| 7,246,368 B1 | 7/2007 | Millet et al. | |
| 7,263,123 B2 | 8/2007 | Yousef | |
| 7,274,735 B2 | 9/2007 | Lusky et al. | |
| 7,315,573 B2 | 1/2008 | Lusky et al. | |
| 7,315,967 B2 | 1/2008 | Azenko et al. | |
| 7,400,677 B2 | 7/2008 | Jones | |
| 7,421,276 B2 | 9/2008 | Steer et al. | |
| 7,451,472 B2 | 11/2008 | Williams | |
| 7,492,703 B2 | 2/2009 | Lusky et al. | |
| 7,554,902 B2 | 6/2009 | Kim et al. | |
| 7,573,884 B2 | 8/2009 | Klimker et al. | |
| 7,573,935 B2 | 8/2009 | Min et al. | |
| 7,616,654 B2 | 11/2009 | Moran et al. | |
| 7,650,112 B2 | 1/2010 | Utsumi et al. | |
| 7,672,310 B2 | 3/2010 | Cooper et al. | |
| 7,684,315 B1 | 3/2010 | Beser | |
| 7,684,341 B2 | 3/2010 | Howald | |
| 7,716,712 B2 | 5/2010 | Booth et al. | |
| 7,739,359 B1 | 6/2010 | Millet et al. | |
| 7,742,697 B2 | 6/2010 | Cooper et al. | |
| 7,742,771 B2 | 6/2010 | Thibeault | |
| 7,778,314 B2 | 8/2010 | Wajcer et al. | |
| 7,787,557 B2 | 8/2010 | Kim et al. | |
| 7,792,183 B2 | 9/2010 | Massey et al. | |
| 7,856,049 B2 | 12/2010 | Currivan et al. | |
| 7,876,697 B2 | 1/2011 | Thompson et al. | |
| 7,953,144 B2 | 5/2011 | Allen et al. | |
| 7,970,010 B2 | 6/2011 | Denney et al. | |
| 8,037,541 B2 | 10/2011 | Montague et al. | |
| 8,040,915 B2 | 10/2011 | Cummings | |
| 8,059,546 B2 | 11/2011 | Pai et al. | |
| 8,116,360 B2 | 2/2012 | Thibeault | |
| 8,265,559 B2 | 9/2012 | Cooper et al. | |
| 8,284,828 B2 | 10/2012 | Cooper et al. | |
| 8,345,557 B2 | 1/2013 | Thibeault et al. | |
| 2001/0055319 A1 | 12/2001 | Quigley et al. | |
| 2002/0038461 A1 | 3/2002 | White et al. | |
| 2002/0044531 A1 | 4/2002 | Cooper et al. | |
| 2002/0091970 A1 | 7/2002 | Furudate et al. | |
| 2002/0116493 A1 | 8/2002 | Schenkel et al. | |
| 2002/0154620 A1 | 10/2002 | Azenkot et al. | |
| 2002/0168131 A1 | 11/2002 | Walter et al. | |
| 2002/0181395 A1 | 12/2002 | Foster et al. | |
| 2003/0028898 A1 | 2/2003 | Howald | |
| 2003/0043732 A1 | 3/2003 | Walton et al. | |
| 2003/0067883 A1 | 4/2003 | Azenkot et al. | |
| 2003/0101463 A1 | 5/2003 | Greene et al. | |
| 2003/0108052 A1 | 6/2003 | Inoue et al. | |
| 2003/0120819 A1 | 6/2003 | Abramson et al. | |

(56) References Cited

U.S. PATENT DOCUMENTS

| | | |
|---|---|---|
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052248 A1* | 3/2004 | Frank et al. ............... 370/352 |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1* | 4/2007 | Thibeault et al. ............ 370/217 |
| 2007/0076789 A1 | 4/2007 | Thibeault |
| 2007/0076790 A1* | 4/2007 | Thibeault et al. ............ 375/222 |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0249421 A1 | 10/2009 | Liu et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0223650 A1 | 9/2010 | Millet et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0110415 A1 | 5/2011 | Cooper et al. |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |
| 2013/0018632 A1* | 1/2013 | Field et al. ............... 702/183 |

FOREIGN PATENT DOCUMENTS

| | | |
|---|---|---|
| EP | 1341335 A2 | 9/2003 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

"Data-Over-Cable Service Interface Specifications DOCSIS 3.0: MAC and Upper Layer Protocols Interface," CM-SP-MULPIv3.0-I16-110623, Cable Television Laboratories, Inc., Jun. 2011, section 8, pp. 242-266.

"Data-Over-Cable Service Interface Specifications DOCSIS® 3.0—MAC and Upper Layer Protocols Interface Specification," CM-SP-MULPIv3.0-I17-111117, Cable Television Laboratories, Inc., Nov. 17, 2011, pp. 770.

"Pre-Equalization Based Pro-active Network Maintenance Process Model for CMs Transmitting on Multiple Upstream Channels," Invention Disclosure 60203, Cable Television Laboratories, Inc., May 2009, pp. 2.

"Pre-Equalization based pro-active network maintenance process model," Invention Disclosure 60177, Cable Television Laboratories, Inc., Jun. 2008, pp. 2.

"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.

Campos, L. A., et al., "Pre-equalization based Pro-active Network Maintenance Methodology," Cable Television Laboratories, Inc., (presentation), 2012, pp. 32.

Howald, R., "Access Networks Solutions: Introduction to S-CDMA," Presentation to Society of Cable Telecommunications Engineers (SCTE) South Florida Chapter, Motorola, Inc., 2009, pp. 15.

Howald, R., "Upstream Snapshots & Indicators (2009)," Regional Samples, Presentation to Society of Cable Telecommunications Engineers (SCTE) South Florida Chapter, Jan. 2010, pp. 22.

Howald, R., et al., "Characterizing and Aligning the HFC Return Path for Successful DOCSIS 3.0 Rollouts," Society of Cable Telecommunications Engineers (SCTE) Cable Tec Expo, Oct. 2009, pp. 66.

(56) References Cited

OTHER PUBLICATIONS

Howald, R., "DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.

Hranac, R., "Linear Distortions, Part 1," Communication Technology, Jul. 1, 2005, accessed at www.cable360.net/print/ct/operations/testing/15131.html, pp. 6.

Liu, X., and Bernstein, A., "Variable Bit Rate Video Services in DOCSIS 3.0 Networks," NCTA Technical Papers, 2008, pp. 12.

Motorola., "White Paper: Expanding Bandwidth Using Advanced Spectrum Management," Sep. 25, 2003, pp. 12.

Newton's Telecom Dictionary, Sep. 1995, Flatiron Publishing, 9th Edition, pp. 216 and 1023, definitions of "carrier to noise ratio" and "signal to noise ratio".

Patrick, M., and Joyce, G., "Delivering Economical IP Video over DOCSIS by Bypassing the M-CMTS with DIBA," SCTE 2007 Emerging Technologies, Topic Subject: Service Velocity & Next Generation Architectures: How Do We Get There?, 2007, pp. 17.

Popper, A., et al, "An Advanced Receiver with Interference Cancellation for Broadband Cable Networks," Juniper Networks, International Zurich Seminar on Broadband Communications Access 2002, pp. 23-1-23-6.

Popper, A., et al, "Ingress Noise Cancellation for the Upstream Channel in Broadband Cable Access Systems," Juniper Networks, IEEE International Conference on Communications 2002, vol. 3, pp. 1808-1812.

Qureshi, S. U. H., "Adaptive Equalization," IEEE, vol. 73, No. 9, Sep. 1985, pp. 1349-1387.

Ramakrishnan, S., "Scaling the DOCSIS Network for IPTV," Cisco Systems, Inc., SCTE Conference on Emerging Technologies and the NCTA Cable Show, 2009, pp. 19.

Shelke, Y. R., "Knowledge Based Topology Discovery and Geo-localization," Thesis, 2010, pp. 173.

Thompson, R., et al., "256-QAM for Upstream HFC," Spring Technical Forum Proceedings, 2010, pp. 142-152.

Thompson, R., et al., "256-QAM for Upstream HFD Part Two," SCTE Cable Tec Expo 2011, Technical Paper, pp. 22.

Thompson, R., et al., "Multiple Access Made Easy," SCTE Cable Tec Expo 2011, Technical Paper, pp. 23.

Thompson, R., et al., "Optimizing Upstream Throughput Using Equalization Coefficient Analysis," National Cable & Telecommunications Association (NCTA) Technical Papers, Apr. 2009, pp. 35.

Thompson, R., et al., "Practical Considerations for Migrating the Network Toward All-Digital," Society of Cable Telecommunications Engineers (SCTE) Cable-Tec Expo, Oct. 2009, pp. 22.

Thompson, R., et al., "64-QAM, 6.4MHz Upstream Deployment Challenges," SCTE Canadian Summit, Toronto, Canada, Technical Paper, Mar. 2011, pp. 25.

Volpe, B., and Miller, W., "Cable-Tec Expo 2011: Advanced Troubleshooting in a DOCSIS © 3.0 Plant," Nov. 14-17, 2011, pp. 17.

Wolcott, L., "Modem Signal Usage and Fault Isolation," U.S. Appl. No. 61/301,835, filed Feb. 5, 2010.

Zhao, F., et al., "Techniques for minimizing error propagation in decision feedback detectors for recording channels," IEEE Transactions on Magnetics, vol. 37, No. 1, Jan. 2001, pp. 12.

"DOCSIS Best Practices and Guidelines; Proactive Network Maintenance Using Pre-Equalization," CM-GL-PNMP-V01-100415, Cable Television Laboratories, Inc., Apr. 15, 2010, pp. 123.

"Radio Frequency Interface Specification," Cable Television Laboratories, Inc., Data-Over-Cable Service Interface Specifications DOCSIS 2.0, CM-SP-RFIv2.0-106-040804, Aug. 4, 2004, pp. 524.

Howald, R. L., et al., "Customized Broadband—Analysis Techniques For Blended Multiplexes," Year 2002, pp. 12.

Howald, R., et al., "Docsis 3.0 Upstream: Readiness & Qualification", SCTE Cable-Tec Expo, Oct. 2009, pp. 17.

Howald, R., et al., "The Grown-Up Potential of a Teenage Phy", NCTA Convention and Exposition, May 2012, pp. 65.

* cited by examiner

UPSTREAM RECEIVER INTEGRITY ASSESSMENT FOR MODEM REGISTRATION

BACKGROUND

A cable modem termination system (CMTS) is communication equipment typically located in a cable operator's headend facility. The CMTS collects and processes communication signals, distributes those signals to cable modems at customer locations using downstream channels, and receives other communication signals from the cable modems at the customer locations on upstream channels. Each cable modem is a communication device that registers with the CMTS to receive the communication signals on the downstream channels from the CMTS, and transmit the other communication signals to the CMTS on the upstream channels. The cable modem may be a standalone device that connects to the Internet, or integrated with a set-top box.

Cable operators need the ability to balance bandwidth on the CMTS multiple upstream or downstream ports accessible by diverse populations of cable modems so overutilization of a single downstream or upstream port does not adversely affect voice, video, and data traffic. A Data Over Cable Services Interface Specification (DOCSIS) load balancing feature in the CMTS enable the cable operator to balance the cable modem traffic across multiple upstream receiver ports and downstream channels.

DETAILED DESCRIPTION

A Cable Modem Termination System (CMTS) configured to utilize Data Over Cable Services Interface Specification (DOCSIS) load balancing will improve the efficiency of the cable modems when the receivers are all unimpaired. When one or more of the receivers are impaired, CMTS load balancing may not work as expected in all situations. The term "receiver" used herein is synonymous with the term "channel".

In one exemplary situation, CMTS load balancing does not work as expected when there are no modems attached to a receiver (i.e., registered) or one or more of the receivers were running distressed. In this situation, the cable operator correctly installed, wired, and powered on the CMTS, but when the cable operator configured the load balancing, modems started to register, then deregister, repeatedly, until the cable operator disabled the load balancing. Diagnostics showed that the problem in this situation was that one of the receivers included in a load balancing group had radio frequency (RF) problems and was not able to keep modems registered (i.e., the receiver was operating on an impaired frequency). Since the load balancing manager program was not notified of the impaired receiver, the load balancing manager continued to move modems to the impaired receiver in an attempt to keep the group of modems balanced. When the load balancing manager moved a modem to the impaired receiver, it would deregister, and then register back on its original receiver. Then, the load balancing manager moved the modems again to rebalance, causing this process to continue until the cable operator disabled the load balancing.

One conventional solution to this exemplary situation is to delay using a receiver for load balancing until at least one modem registers to use the modem. Since this means that sometimes the cable operator will need to manually move a modem to a receiver before load balancing will start to work, this is not an attractive solution.

Another conventional solution to this exemplary situation is to add a configuration setting to the CMTS to allow the cable operator to mark a receiver as available for use by load balancing even if no modems have registered to use the modem. This solution creates the same situation, as described above, if any of the marked receivers are impaired because modems will deregister and start the whole process of registration and de-registration over again.

Yet another conventional solution to this exemplary situation is to monitor the quality of the receivers without intervention by the cable operator to help the load balancing to work properly. This solution improves the CMTS DOCSIS load balancing by automatically identifying and repairing impaired upstream channels in the CMTS, and notifying the load balancing of the receiver status.

Figure 1:
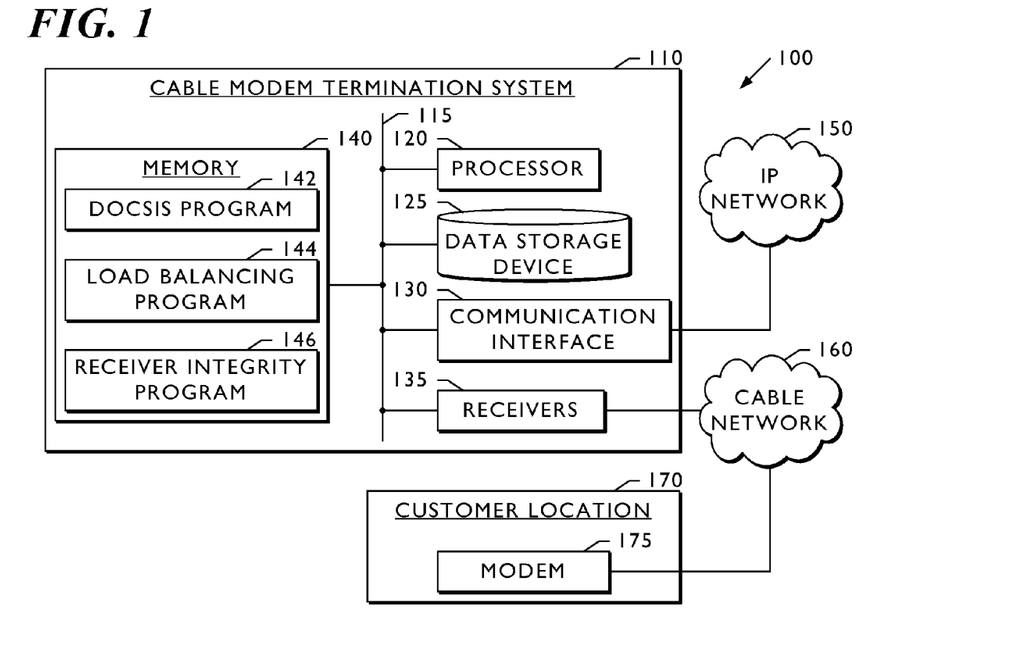
FIG. 1 is a block diagram that illustrates one embodiment of the hardware components for assessing the integrity of receivers in a CMTS to improve load balancing.

FIG. 1 is a block diagram that illustrates one embodiment of the hardware components for assessing the integrity of receivers in a CMTS to improve load balancing. A broadband network 100 includes a CMTS 110, Internet protocol (IP) network 150, cable network 160, and customer location 170. The broadband network 100 shown in FIG. 1 may include any number of interconnected CMTS 110, IP network 150, cable network 160, and customer location 170 components.

The CMTS 110 shown in FIG. 1 is communication equipment (e.g., the Motorola Broadband Services Router (BSR) or Video Services Platform (VSP) products) located in a cable operator's headend or hubsite that provides high-speed data services, such as cable Internet or voice over Internet protocol, to cable subscribers. A bus 115 is a communication medium connecting a processor 120, data storage device 125, communication interface 130, a number of receivers 135, and memory 140. Even though the CMTS 110 shown in FIG. 1 includes a single processor 120, one skilled in the art will understand that the CMTS 110 may include a number of processors 120 to improve the speed and efficiency of the CMTS 110. In various embodiments, the data storage device 125 is a serial ATA (SATA) hard disk drive, optical drive, small computer system interface (SCSI) disk, flash memory, or the like. The communication interface 130 connects the CMTS 110 to the IP network 150 and allows for two-way communication of data and content. The receivers 135 connect the CMTS 110 to the cable network 160 and allow for two-way communication of data and content with modems 175 at customer locations 170. In various embodiments, the memory 140 is random access memory (RAM), dynamic RAM (DRAM), non-volatile computer memory, flash memory, or the like.

The processor 120 in the CMTS 110 shown in FIG. 1 performs the disclosed methods by executing sequences of operational instructions that comprise each computer program resident in, or operative on, the memory 140. The reader should understand that the memory 140 may include operating system, administrative, and database programs that support the programs disclosed in this application. In one embodiment, the configuration of the memory 140 of the CMTS 110 includes a DOCSIS program 142, load balancing program 144, and receiver integrity program 146. In one embodiment, the DOCSIS program 142 is an implementation of DOCSIS 3.0. The DOCSIS program 142, together with the load balancing program 144 and receiver integrity program 146, perform the methods disclosed in the exemplary embodiments depicted in FIG. 2, FIG. 3, FIG. 4, FIG. 5, FIG. 6, and FIG. 7. When the processor 120 performs the disclosed method, it stores intermediate results in the memory 140 or data storage device 125. In another embodiment, the processor 120 may swap these programs, or portions thereof, in and out of the memory 140 as needed, and thus may include fewer than all of these programs at any one time.

The IP network 150 shown in FIG. 1, in one embodiment, is a public communication network or wide area network (WAN) that connects to the CMTS 110. The present invention also contemplates the use of comparable network architectures including a LAN, a personal area network (PAN) such as a Bluetooth network, a wireless LAN (e.g., a wireless-fidelity (Wi-Fi) network), peer-to-peer overlay network, and a virtual private network (VPN). The system contemplates comparable network architectures and protocols such as Ethernet and transmission control protocol.

The cable network 160 shown in FIG. 1, in one embodiment, is a hybrid fiber-coaxial (HFC) network. The cable network 160 is a data and video content network that provides two-way communication between the CMTS 110 and each customer location 170. The downstream communication path is from the CMTS 110 to each customer location 170. The upstream communication path is from each customer location 170 to the CMTS 110.

The customer location 170 shown in FIG. 1 is a customer's home, business, or another location where the customer accesses the cable service. In one embodiment, the customer location 170 includes a cable modem 175 that connects to the cable network 160 and allows for two-way communication of data and content with the receivers 135 in the CMTS 110.

Figure 2:
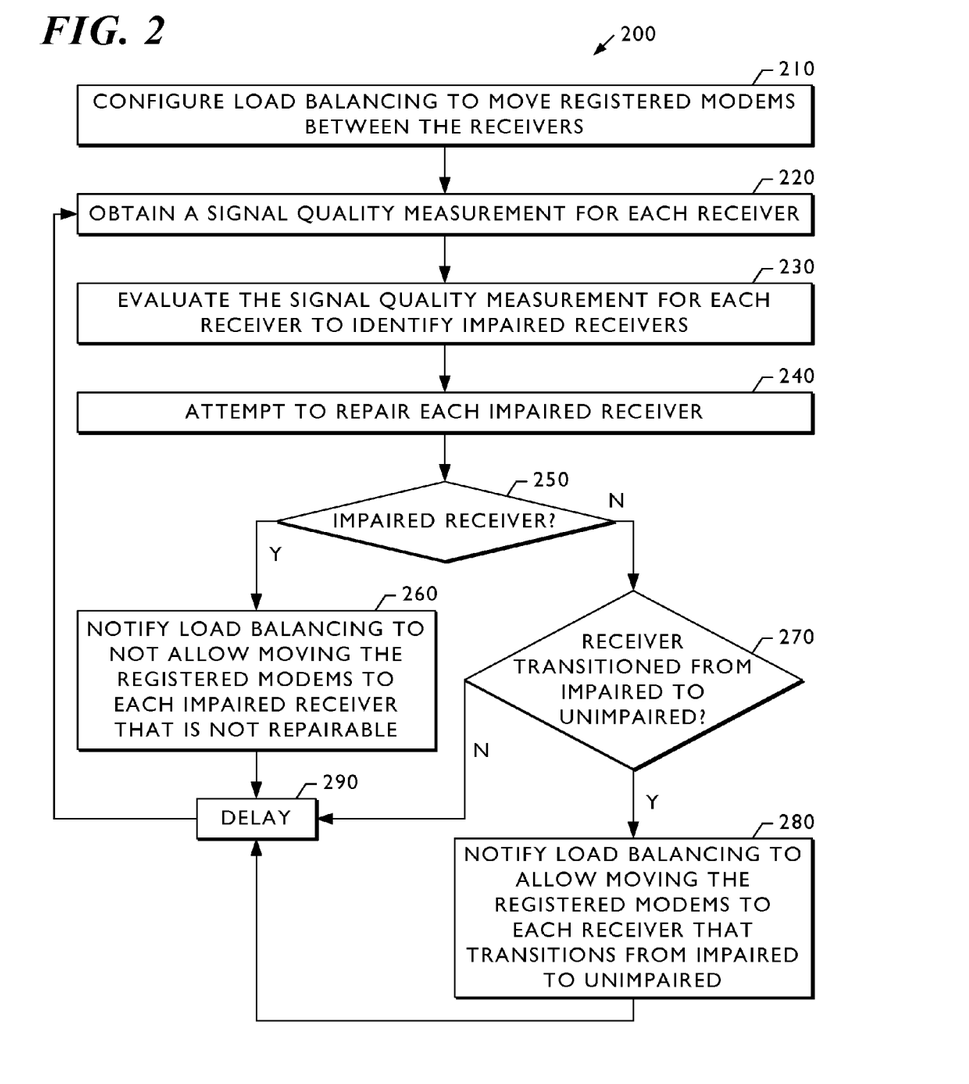
FIG. 2 is a flow diagram that illustrates one embodiment of a method for assessing the integrity of receivers in a CMTS to improve load balancing.

FIG. 2 is a flow diagram that illustrates one embodiment of a method for assessing the integrity of receivers in a CMTS to improve load balancing. The process 200 shown in FIG. 2, with reference to FIG. 1, begins when a cable operator configures the load balancing program 144 on the CMTS 110 to move registered modems between a group of receivers 135 (step 210) in an effort to balance the load on the individual receivers 135. When a customer powers-on a modem 175 at a customer location 170, the modem 175 sends a registration request to the CMTS 110. The CMTS 110 receives the registration request, and assigns the modem 175 to one of the receivers 135 for communication with the CMTS 110. The receiver integrity program 146 obtains a signal quality measurement for each receiver 135 (step 220), evaluates the signal quality measurement for each receiver 135 to identify receivers 135 that are tuned to an impaired frequency (i.e., impaired receivers) (step 230), and attempts to repair each impaired receiver (step 240). For each impaired receiver that is not repairable (step 250, Y branch), the receiver integrity program 146 sends a notification to the load balancing program 144 to not allow moving the registered modems to the impaired receiver (step 260), delays for a period of time (step 290), and continues monitoring the receivers 135 (step 220). For each unimpaired receiver (step 250, N branch), the receiver integrity program 146 determines whether the unimpaired receiver status has transitioned from impaired to unimpaired (step 270). If the unimpaired receiver transitioned from impaired to unimpaired (step 270, Y branch), the receiver integrity program 146 notifies to the load balancing program 144 to allow moving the registered modems to the unimpaired receiver that was previously impaired (step 280), and delays for a period of time (step 290) before continuing to monitor the receivers 135 (step 220). If the unimpaired receiver has not transitioned from impaired to unimpaired (step 270, N branch), the receiver integrity program 146 delays for a period of time (step 290) before continuing to monitor the receivers 135 (step 220).

Figure 3:
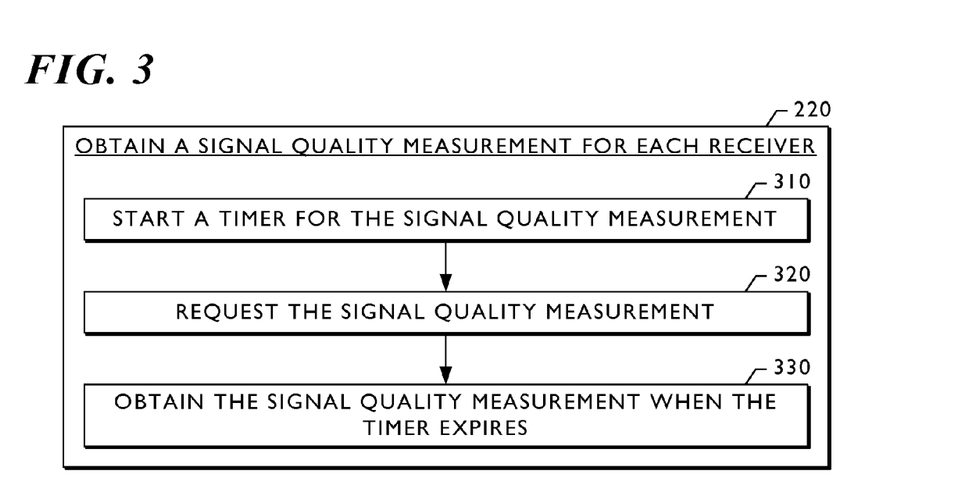
FIG. 3 is a flow diagram that illustrates one embodiment of a method for obtaining a signal quality measurement for each receiver in a load balancing group shown in FIG. 2.

FIG. 3 is a flow diagram that illustrates one embodiment of a method for obtaining a signal quality measurement for each receiver in a load balancing group shown in FIG. 2. The process for obtaining a signal quality measurement for each receiver 135 (step 220) shown in FIG. 2, with reference to FIG. 1, begins when the receiver integrity program 146 starts a timer for the signal quality measurement (step 310). The receiver integrity program 146 requests the signal quality measurement for each receiver 135 (step 320), and when the timer expires, obtains the signal quality measurement (step 330). In one embodiment, the receiver integrity program 146 obtains a signal quality measurement as a Fast Fourier Transform (FFT), Receiver Signal Strength Indicator (RSSI) measurement, or the like. In another embodiment, the receiver integrity program 146 obtains a signal quality measurement as a Modulation Error Ratio (MER) measurement, Signal-to-Noise Ratio (SNR) measurement, Carrier-to-Noise Ratio (CNR) measurement, or the like.

Figure 4:
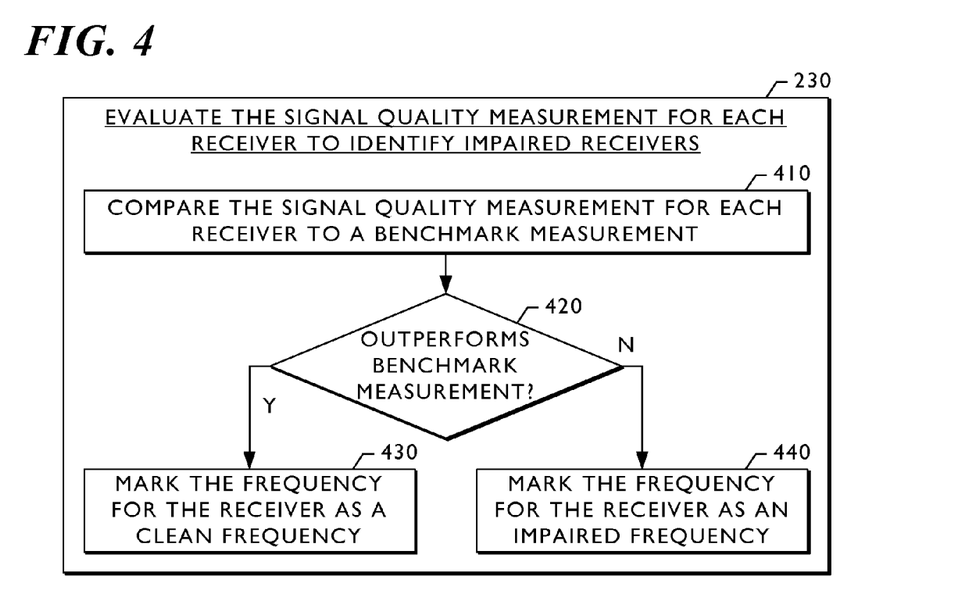
FIG. 4 is a flow diagram that illustrates one embodiment of a method for evaluating the signal quality measurement for each receiver in a load balancing group to identify impaired receivers shown in FIG. 2.

FIG. 4 is a flow diagram that illustrates one embodiment of a method for evaluating the signal quality measurement for each receiver in a load balancing group to identify impaired receivers shown in FIG. 2. When the receiver integrity program 146 obtains the signal quality measurement as an FFT measurement or RSSI measurement, the process for evaluating the signal quality measurement for each receiver 135 (step 230) shown in FIG. 2, with reference to FIG. 1, begins when the receiver integrity program 146 compares the signal quality measurement for each receiver 135 to a benchmark measurement (step 410). If the signal quality measurement for the receiver 135 outperforms the benchmark measurement (step 420, Y branch), the receiver integrity program 146 marks the frequency that the receiver 135 is using as a clean frequency (i.e., the receiver is unimpaired) (step 430). If the signal quality measurement for the receiver 135 does not outperform the benchmark measurement (step 420, N branch), the receiver integrity program 146 marks the frequency that the receiver 135 is using as an impaired frequency (i.e., the receiver is impaired) (step 440).

Figure 5:
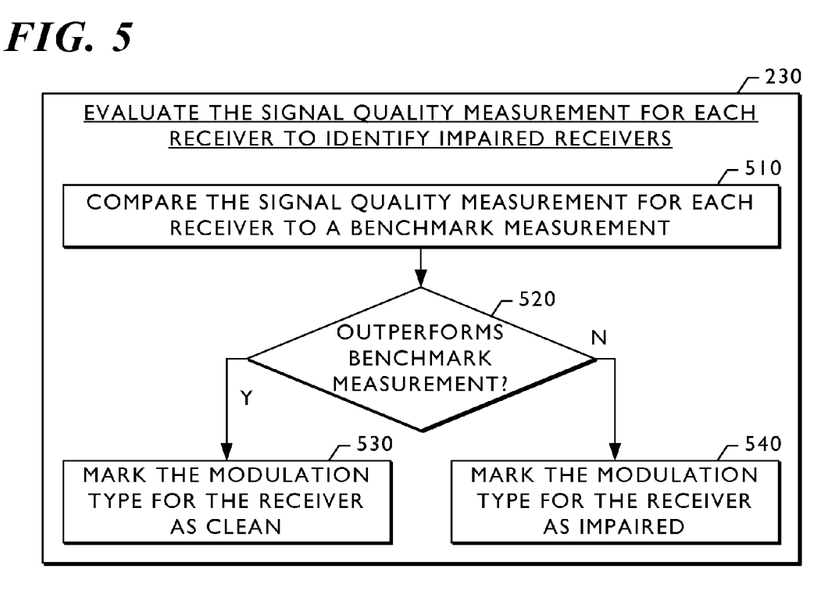
FIG. 5 is a flow diagram that illustrates another embodiment of a method for evaluating the signal quality measurement for each receiver in a load balancing group to identify impaired receivers shown in FIG. 2.

FIG. 5 is a flow diagram that illustrates another embodiment of a method for evaluating the signal quality measurement for each receiver in a load balancing group to identify impaired receivers shown in FIG. 2. When the receiver integrity program 146 obtains the signal quality measurement as an MER measurement, SNR measurement, or CNR measurement, the process for evaluating the signal quality measurement for each receiver 135 (step 230) shown in FIG. 2, with reference to FIG. 1, begins when the receiver integrity program 146 compares the signal quality measurement for each receiver 135 to a benchmark measurement (step 510). If the signal quality measurement for the receiver 135 outperforms the benchmark measurement (step 520, Y branch), the receiver integrity program 146 marks the modulation type for the receiver 135 as clean (i.e., the receiver is unimpaired) (step 530). If the signal quality measurement for the receiver 135 does not outperform the benchmark measurement (step 520, N branch), the receiver integrity program 146 marks the modulation type for the receiver 135 as impaired (i.e., the receiver is impaired) (step 540).

Figure 6:
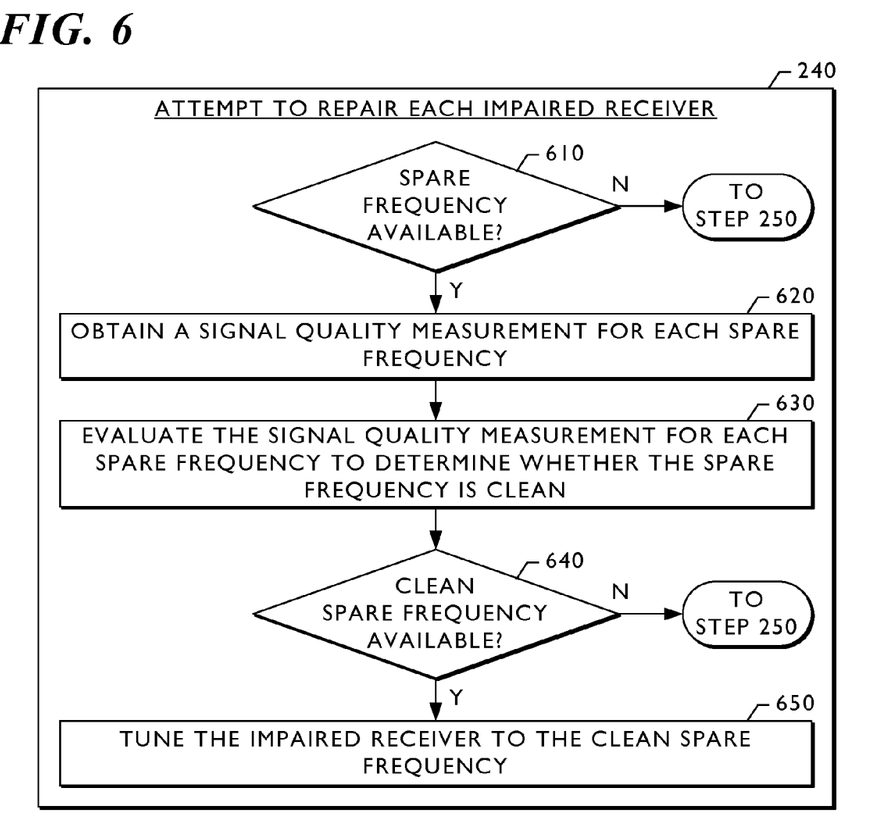
FIG. 6 is a flow diagram that illustrates one embodiment of a method for attempting to repair each impaired receiver in a load balancing group shown in FIG. 2.

FIG. 6 is a flow diagram that illustrates one embodiment of a method for attempting to repair each impaired receiver in a load balancing group shown in FIG. 2. When the receiver integrity program 146 obtains the signal quality measurement as an FFT measurement or RSSI measurement, the process for attempting to repair each impaired receiver 135 (step 240) shown in FIG. 2, with reference to FIG. 1, begins when the receiver integrity program 146 determines whether a spare frequency is available for the impaired receiver (step 610). If no spare frequency is available (step 610, N branch), the receiver integrity program 146 returns to step 250 in FIG. 2. If spare frequencies are available for the impaired receiver (step 610, Y branch), the receiver integrity program 146 obtains a signal quality measurement for each spare frequency (step 620) using a method similar to that shown for obtaining a signal quality measurement for each receiver shown in FIG. 2 and FIG. 3. The receiver integrity program 146 then evaluates the signal quality measurement for each spare frequency to determine whether the spare frequency is clean (step 630) using a method similar to that shown for evaluating the signal quality measurement for each receiver to identify impaired receivers shown in FIG. 2 and FIG. 4. If a clean spare frequency is not available (step 640, N branch), the receiver integrity program 146 returns to step 250 in FIG. 2. If clean spare frequencies are available (step 640, Y branch), the receiver integrity program 146 tunes each impaired receiver to one of the clean spare frequencies (step 650). If there are fewer clean spare frequencies than impaired receivers, the clean spare frequencies will be used to repair some of the impaired receivers and the remaining impaired receivers will remain impaired.

Figure 7:
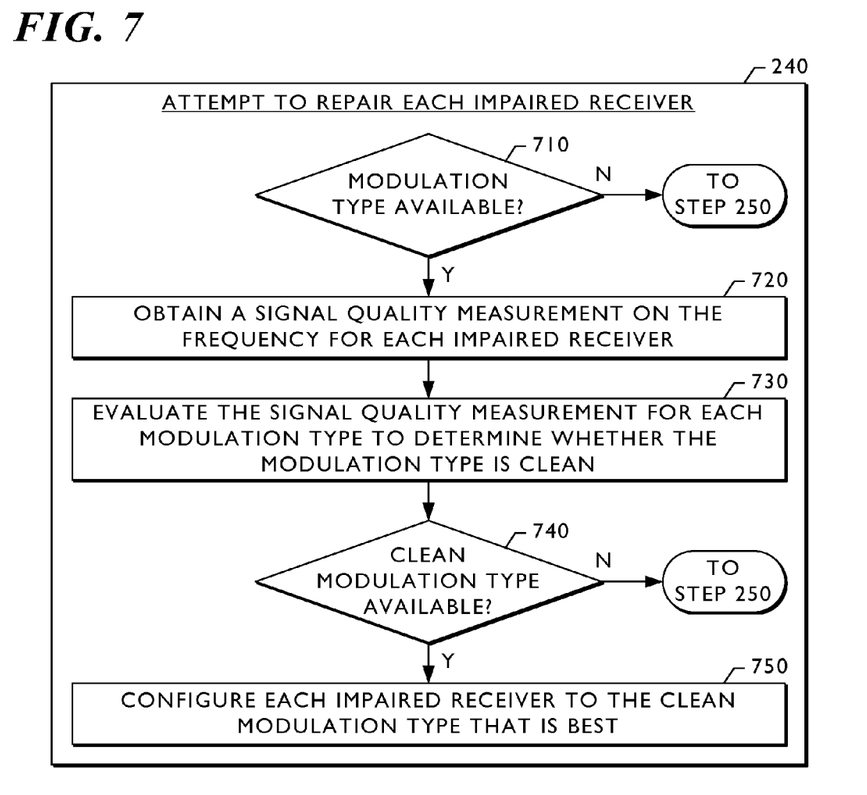
FIG. 7 is a flow diagram that illustrates another embodiment of a method for attempting to repair each impaired receiver in a load balancing group shown in FIG. 2.

FIG. 7 is a flow diagram that illustrates another embodiment of a method for attempting to repair each impaired receiver in a load balancing group shown in FIG. 2. When the receiver integrity program 146 obtains the signal quality measurement as an MER measurement, SNR measurement, or CNR measurement, the process for attempting to repair each impaired receiver 135 (step 240) shown in FIG. 2, with reference to FIG. 1, begins when the receiver integrity program 146 determines whether a modulation type is available for the impaired receiver (step 710). If no modulation type is available (step 710, N branch), the receiver integrity program 146 returns to step 250 in FIG. 2. If modulation types are available for the impaired receiver (step 710, Y branch), the receiver integrity program 146 obtains a signal quality measurement on the frequency for each impaired receiver (step 720) using a method similar to that shown for obtaining a signal quality measurement for each receiver shown in FIG. 2 and FIG. 3. The receiver integrity program 146 then evaluates the signal quality measurement for each modulation type to determine whether the modulation type is clean (step 730) using a method similar to that shown for each receiver to identify impaired receivers shown in FIG. 2 and FIG. 5. If a clean modulation type is not available (step 740, N branch), the receiver integrity program 146 returns to step 250 in FIG. 2. If clean modulation types are available (step 740, Y branch), the receiver integrity program 146 configures each impaired receiver to one of the clean modulation types that is best (step 740).

One obvious time that the load balancing program 144 monitors a receiver 135 is when there are no modems registered to use the receiver 135. Any time a receiver has no modems registered (i.e., when it comes up for the first time or for some reason all the modems deregister or are moved off) the load balancing program 144 will not be allowed to move modems to that receiver. At this time, the receiver integrity program 146 will run to monitor the quality of the channel using a spectrum management method (e.g., FFT or RSSI) and for each receiver 135 that the receiver integrity program 146 decides is clean, the load balancing program 144 will be notified and allowed to move modems to the receiver 135. Until the load balancing program 144 is notified regarding a receiver 135, no modems are allowed to be moved to that receiver 135. If a modem happens to register (and stay registered) on a receiver 135 while the receiver integrity program 146 is monitoring the receiver 135, the load balancing program 144 will be notified that the receiver 135 is reliable enough to be used.

In one embodiment, the receiver integrity program 146 monitors the receivers 135 to determine whether each receiver 135 is clean enough to be used for load balancing, and notifies load balancing program 144. In another embodiment, the receiver integrity program 146 not only monitors the receivers 135, but also attempts to repair the impaired receivers, if possible. For example, if the receiver integrity program 146 determines that a receiver 135 is impaired and unusable for load balancing, and there is at least one clean spare frequency available for use (also tested during the FFT measurements), then the receiver integrity program 146 will retune the receiver to the clean frequency, and notify the load balancing program 144 that the receiver 135 can be used to balance modems if the receiver 135 has transitioned from impaired to unimpaired. If the load balancing program 144 believes that the receiver 135 was not impaired, the receiver integrity program 146 will not notify the load balancing program 144 and will have averted a potential problem for the load balancing program 144. If the receiver integrity program 146 determines that the active and spare frequencies are impaired for a receiver 135, it will periodically monitor the impaired receiver and test the frequencies until it finds a clean frequency that it can use. As shown in FIG. 5 and FIG. 7, the receiver integrity program 146 can utilize spare modulation types in the same manner as spare frequencies to determine whether it can make an impaired receiver clean enough to register modems and allow the receiver 135 to be used for load balancing.

In yet another embodiment, the receiver integrity program 146 periodically monitors the receivers 135 for impairments (even when modems are registered), and notifies the load balancing program 144 whenever a receiver 135 becomes impaired and cannot be repaired, or when a receiver 135 transitions from being impaired to unimpaired. The load balancing program 144 is notified to stop load balancing modems to a particular receiver 135 when the receiver 135 becomes impaired and there is no way to repair it. The receiver integrity program 146 helps to prevent the load balancing program 144 from moving modems to an impaired receiver 135 because data loss or deregistration may happen. When the receiver 135 becomes clean, the load balancing program 144 will be notified and can start to reuse that receiver 135 to load balance modems.

Once the receiver integrity program 146 notifies the load balancing program 144 that a receiver 135 is impaired and should not be used for load balancing modems, the receiver integrity program 146 continues to monitor that receiver 135. The reason being that the scheduled timer for load balancing may not fire for a while (if it is timer based) and the receiver 135 may become impaired again before the timer fires. If the receiver 135 does become impaired before use, the receiver integrity program 146 will notify the load balancing program 144 again that the receiver 135 is unusable until the receiver 135 is clean of impairments. The opposite could also happen where the receiver 135 was clean and the receiver integrity program 146 allowed the load balancing program 144 to use the receiver 135, but before the load balancing timer fired, the receiver 135 went impaired again. Load balancing has to always be made aware when the status of a receiver 135 transitions from unimpaired to impaired, or from impaired to unimpaired.

Although the disclosed embodiments describe a fully functioning method and computing device for assessing the integrity of receivers in a CMTS to improve load balancing, the reader should understand that other equivalent embodiments exist. Since numerous modifications and variations will occur to those reviewing this disclosure, the method and computing device for assessing the integrity of receivers in a CMTS to improve load balancing is not limited to the exact construction and operation illustrated and disclosed. Accordingly, this disclosure intends all suitable modifications and equivalents to fall within the scope of the claims.

We claim:

1. A method for assessing the integrity of receivers in a Cable Modem Termination System (CMTS) to improve load balancing, comprising:
    configuring a load balancing manager to move registered modems between the receivers, each receiver tuned to a frequency;
    obtaining a signal quality measurement for each receiver;
    for each receiver, evaluating the signal quality measurement, and identifying the receiver as an impaired receiver when the frequency to which the receiver is tuned is identified by the evaluating as an impaired frequency;
    attempting to repair each impaired receiver; and
    notifying the load balancing manager to not allow moving the registered modems to each impaired receiver that is not repairable, and to allow moving the registered modems to each receiver that transitions from impaired to unimpaired.

2. The method of claim 1, wherein the obtaining of the signal quality measurement further comprises:
    starting a timer for the signal quality measurement;
    requesting the signal quality measurement; and
    obtaining the signal quality measurement when the timer expires.

3. The method of claim 1, wherein the signal quality measurement is at least one of a Fast Fourier Transform measurement, and Receive Signal Strength Indicator measurement.

4. The method of claim 3, wherein the evaluating of the signal quality measurement further comprises:
    comparing the signal quality measurement to a benchmark measurement,
    wherein when the signal quality measurement outperforms the benchmark measurement, a result of the evaluating indicates that the frequency is a clean frequency, and
    wherein when the signal quality measurement underperforms the benchmark measurement, a result of the evaluating indicates that the frequency is an impaired frequency.

5. The method of claim 3, wherein the attempting to repair each impaired receiver further comprises:
    if at least one spare frequency is available:
        obtaining a signal quality measurement for each spare frequency;
        evaluating the signal quality measurement for each spare frequency to determine whether each spare frequency is clean; and
        tuning each impaired receiver to a clean spare frequency when the clean spare frequency is available.

6. The method of claim 1, wherein the signal quality measurement is at least one of a Modulation Error Ratio (MER) measurement, Signal-to-Noise Ratio (SNR) measurement, and Carrier-to-Noise Ratio (CNR) measurement.

7. The method of claim 6, wherein the evaluating of the signal quality measurement further comprises:
    comparing the signal quality measurement to a benchmark measurement,
    wherein when the signal quality measurement outperforms the benchmark measurement, a result of the evaluating indicates that a modulation type is clean, and
    wherein when the signal quality measurement underperforms the benchmark measurement, a result of the evaluating indicates that the modulation type is impaired.

8. The method of claim 6, wherein the attempting to repair each impaired receiver further comprises:
    if at least one modulation type is available:
        obtaining a signal quality measurement on the frequency for each impaired receiver;
        evaluating the signal quality measurement for each modulation type to determine whether each modulation type is clean; and
        configuring each impaired receiver to a clean modulation type that is best when the clean modulation type is available.

9. A computing device, comprising:
    a communication interface to connect receivers in the computing device to a network of modems;
    a memory device resident in the computing device; and
    a processor disposed in communication with the communication interface and the memory device, the processor configured to:
        configure a load balancing manager to move registered modems between the receivers, each receiver tuned to a frequency;
        obtain a signal quality measurement for each receiver;
        for each receiver, evaluate the signal quality measurement, and identify the receiver as an impaired receiver when the frequency to which the receiver is tuned is identified by the evaluating as an impaired frequency;
        attempt to repair each impaired receiver; and
        notify the load balancing manager to not allow moving the registered modems to each impaired receiver that is not repairable, and to allow moving the registered modems to each receiver that transitions from impaired to unimpaired.

10. The computing device of claim 9, wherein to obtain the signal quality measurement, the processor is further configured to:
    start a timer for the signal quality measurement;
    request the signal quality measurement; and
    obtain the signal quality measurement when the timer expires.

11. The computing device of claim 9, wherein the signal quality measurement is at least one of a Fast Fourier Transform measurement, and Receive Signal Strength Indicator measurement.

12. The computing device of claim 11, wherein to evaluate the signal quality measurement, the processor is further configured to:
compare the signal quality measurement to a benchmark measurement,
wherein when the signal quality measurement outperforms the benchmark measurement, a result of the evaluating indicates that the frequency is a clean frequency, and
wherein when the signal quality measurement underperforms the benchmark measurement, a result of the evaluating indicates that the frequency is an impaired frequency.

13. The computing device of claim 11, wherein to attempt to repair each impaired receiver, the processor is further configured to:
if at least one spare frequency is available:
obtain a signal quality measurement for each spare frequency;
evaluate the signal quality measurement for each spare frequency to determine whether each spare frequency is clean; and
tune each impaired receiver to a clean spare frequency when the clean spare frequency is available.

14. The computing device of claim 9, wherein the signal quality measurement is at least one of a Modulation Error Ratio (MER) measurement, Signal-to-Noise Ratio (SNR) measurement, and Carrier-to-Noise Ratio (CNR) measurement.

15. The computing device of claim 14, wherein to evaluate the signal quality measurement, the processor is further configured to:
compare the signal quality measurement to a benchmark measurement,
wherein when the signal quality measurement outperforms the benchmark measurement, a result of the evaluating indicates that a modulation type is clean, and
wherein when the signal quality measurement underperforms the benchmark measurement, a result of the evaluating indicates that the modulation type is impaired.

16. The computing device of claim 14, wherein to attempt to repair each impaired receiver, the processor is further configured to:
if at least one modulation type is available:
obtain a signal quality measurement on the frequency for each impaired receiver;
evaluate the signal quality measurement for each modulation type to determine whether each modulation type is clean; and
configure each impaired receiver to a clean modulation type that is best when the clean modulation type is available.

17. A non-transitory computer-readable medium, comprising computer-executable instructions that, when executed on a computing device, perform steps of:
configuring a load balancing manager to move registered modems between the receivers, each receiver tuned to a frequency;
obtaining a signal quality measurement for each receiver;
for each receiver, evaluating the signal quality measurement, and identifying the receiver as an impaired receiver when the frequency to which the receiver is tuned is identified by the evaluating as an impaired frequency;
attempting to repair each impaired receiver; and
notifying the load balancing manager to not allow moving the registered modems to each impaired receiver that is not repairable, and to allow moving the registered modems to each receiver that transitions from impaired to unimpaired.

* * * * *